July 5, 1966 S. W. NEWELL 3,259,441

THRUST BEARING AND SHOE RETAINING MEANS THEREFOR

Filed Aug. 30, 1963

INVENTOR.
SIDNEY W. NEWELL
BY
Flehr and Swain
ATTORNEYS.

United States Patent Office 3,259,441
Patented July 5, 1966

3,259,441
THRUST BEARING AND SHOE RETAINING
MEANS THEREFOR
Sidney W. Newell, Alameda, Calif., assignor to The Union
Diesel Engine Company, Oakland, Calif., a corporation
of California
Filed Aug. 30, 1963, Ser. No. 305,599
20 Claims. (Cl. 308—160)

This invention relates to thrust bearings of the type including a plurality of bearing or thrust shoes and to means for retaining said thrust shoes in assembly with the overall bearing.

Conventional forms of thrust bearings include the type having a retainer ring and an annular array of thrust or bearing shoes disposed about the ring for rocking movement thereon. When the bearing is installed it is necessary that the individual thrust shoes are free of relatively independent rocking movement. Any interconnection between the shoes and the retaining ring must permit this rocking movement not only in a circumferential direction to permit and facilitate the flow of oil therethrough, but also frequently in a radial direction to accommodate the load upon the bearing. Consequently, it is desirable to have the individual shoes completely free of any restrictive means fastening them to the retaining ring.

Once the bearing is installed, pressure from the bearing load serves to maintain the individual shoes in place on the retainer ring. Prior to such installation, however, completely free thrust shoes may fall off or out of the retaining ring during handling. For these reasons, thrust bearings of this type have in the past required a considerable amount of care in handling and assembly and even with such care, the shoes frequently fall from the bearing and the fine machined surfaces thereof are damaged, necessitating repair or replacement.

It is, therefore, a general object of this invention to provide an improved thrust bearing and means for retaining thrust shoes thereon.

It is a more particular object of this invention to provide an improved thrust bearing of the aforementioned character wherein the means for retaining the shoes in assembly with the remainder of the bearing present no restraint to the individual shoes during normal operation.

It is another object of this invention to provide a thrust bearing and shoe retaining means of the aforementioned character including a deformable interconnection between the thrust shoes and the remainder of the bearing.

It is still another object of this invention to provide such bearings of the aforementioned character wherein a deformable connection between the shoes and the remainder of the bearing has sufficient strength to withhold the shoe from falling out of assembly prior to installation but has a strength insufficient to restrain movement of the shoe during its normal operation.

It is still another object of this invention to provide restraining means for a thrust bearing of the aforementioned character in which the restraining means during normal operation of the shoe, do not contact the thrust shoes themselves.

The above and other objects and features of the invention will become more clearly apparent upon a review of the following description in conjunction with the accompanying drawing, wherein:

FIGURE 1, in views A, B, C and D illustrate a thrust bearing in accordance with the present invention and four preferred embodiments of the restraining means for the thrust shoes;

Figure 2:
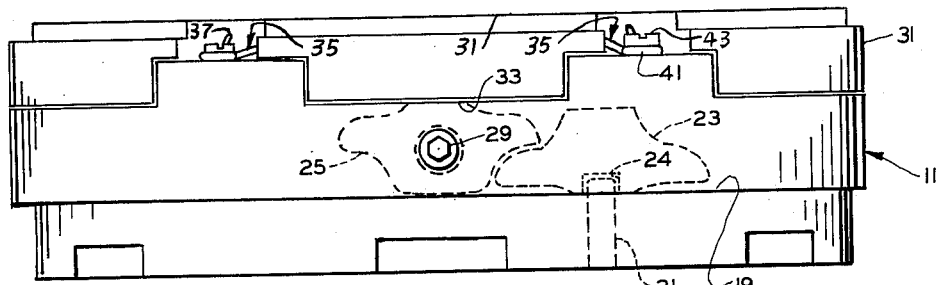
FIGURE 2 is an elevational view taken along the line 2—2 of FIGURE 1 showing the preferred embodiment of view A of FIGURE 1.
Figure 1:
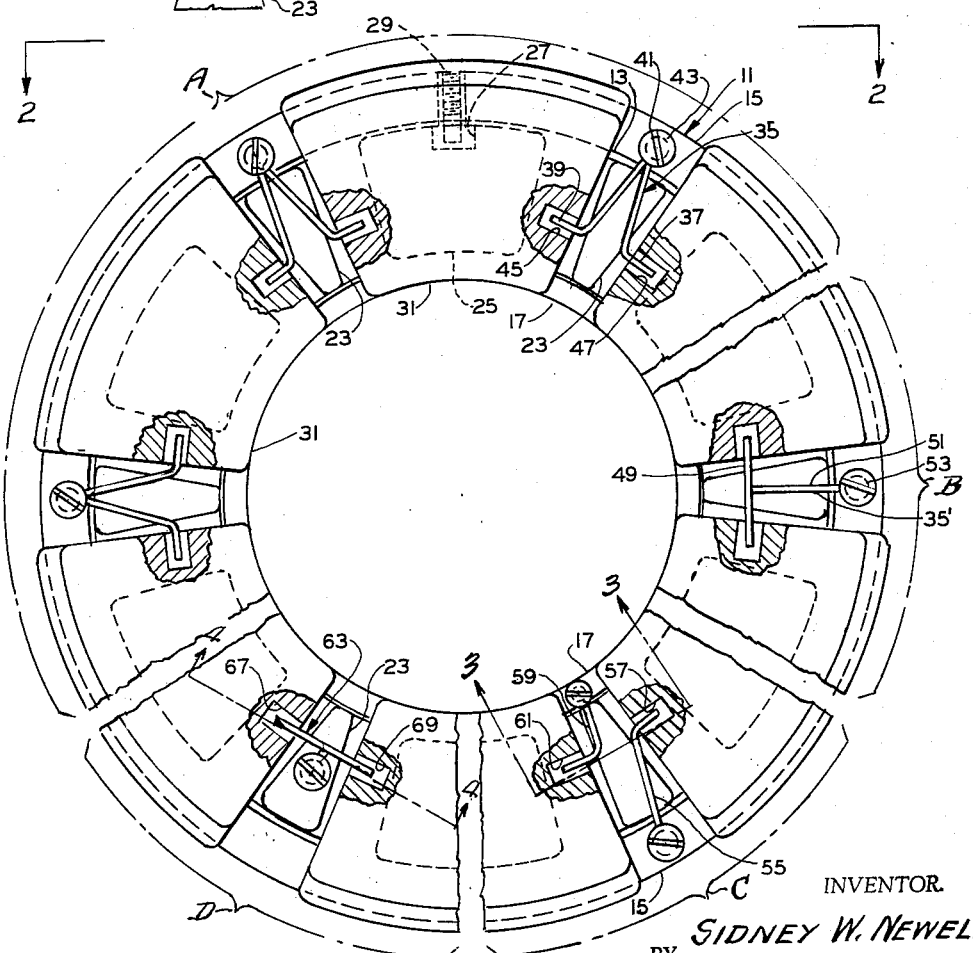

Referring to FIGURE 1 in its entirety and to FIGURE 2, there is shown a thrust bearing having a retainer ring 11 which includes an annular shaped channel 13 having outer and inner side walls 15 and 17, respectively, as well as a floor portion 19. A plurality of pins 21 extend upwardly from the floor portion and a first or lower set of leveling blocks 23 is disposed about the retainer ring with one leveling block superimposed upon each of the pins 21. The dimension of the pins 21 and the opening 24 in the leveling block 23 is such as to permit free rocking movement of the leveling block with respect to the retainer ring floor 19.

A second or upper set of leveling blocks 25 is likewise disposed about the retainer ring 11 with one side of each of the upper leveling blocks 25 resting on facing sides of adjacent ones of the lower leveling blocks 23. The outer portion of each of the leveling blocks 25 includes an opening 27 in which is loosely fitted the end of a set screw 29 threaded in the outer wall 15 of the retainer ring. The dimensions of the openings 27 and the set screws 29 are such as to permit free rocking movement of the leveling blocks 25, with respect to the lower blocks 23. The surfaces of contact between the lower blocks 23 and the upper blocks 25 are curved to further facilitate this rocking movement.

Also disposed about the retainer ring 11 is a plurality of thrust shoes 31 having a substantially flat upper surface and a generally spherical bearing surface 33 on the underside thereof. Each of the spherical surfaces 33 is adapted to be positioned upon one of the upper leveling blocks 25.

It is seen that during normal operation of the bearing thus far described, that is, with loading in an axial direction with respect to the retainer ring 11, the shoes 31 will be held in position with the remainder of the bearing by the pressure of the load. However, prior to installation of the bearing in its operating environment, the shoes 31 can easily be dislodged from their position. Consequently, shoe retaining means are employed to maintain the shoes in assembly with the retainer ring prior to installation of the bearing. This means generally comprises one or more deformable links connecting the individual thrust shoes to the remainder of the assembly. The deformable links should have sufficient strength to withhold the weight of the thrust shoe when the bearing is turned upside-down from its position shown in FIGURE 2 but insufficient strength to restrain the thrust shoe from its normal movement under operational conditions. For example, in a six inch thrust bearing, as shown in the drawing, the individual shoes may weigh only several ounces. Under operating conditions the loading may be as much as 5,500 pounds at 3600 r.p.m. or almost 1,000 pounds per shoe. In such an example the deformable links may be formed of light gauge wire which will clearly support the several ounces of weight, but will deform under the operating load.

One embodiment of this shoe retaining means is shown in FIGURE 1 at A and in FIGURE 2. Thus there is shown a clip or link 35 having two ends 37 and 39, as well as a central portion 41 held in position on the outer wall 15 by means of the screw 43. The ends 37 and 39 are loosely fitted or positioned in recesses 45 and 47 which may be drilled. The recesses 45 and 47 lie in facing side edges of adjacent thrust shoes 31.

Even though the material of the link or clip 35 is insufficiently strong to restrain movement of the thrust shoes under normal operating pressure on the bearing, it is preferred that the openings 45 and 47 be significantly larger in cross section than the ends 37 and 39. The looseness of the fit should be such that during normal operating conditions the thrust shoes 31 can rock to their maximum extent without the walls of the recesses 45 and 47 contacting the ends 37 and 39 of the link 35.

While the embodiment shown at A in FIGURE 1 and FIGURE 2 is satisfactory for relatively small bearings, other embodiments of the invention may be more desirable for larger bearings. Thus in FIGURE 1 at B the link 35′ is shown as a T shaped bar having a cross member 49 and a leg member 51. The opposite ends of the cross member 49 are positioned in facing openings of adjacent thrust shoes while the leg member is connected to the outer rim 15 by means of the screw 53.

Figure 3:
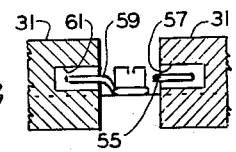
FIGURE 3 is a sectional view taken along the line 3—3 of FIGURE 1 showing the embodiment of view C of FIGURE 1.

Another alternative embodiment is shown at C of FIGURE 1 and in FIGURE 3. This embodiment is particularly useful in the case of split bearings wherein the bearing is formed in two semi-annular pieces which are joined together during installation. Thus the clip or link 55 has one end loosely fitted in the opening 57 of one thrust shoe while the link 59 has one end loosely fitted in the opening 61 of the adjacent thrust shoe. The opposite ends of the links 55 and 59 are connected to the outer and inner walls 15 and 17, respectively.

Figure 4:
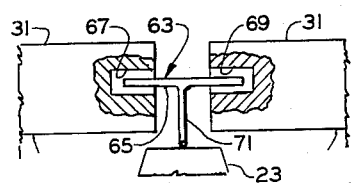
FIGURE 4 is a sectional view taken along the line 4—4 of FIGURE 1 showing the embodiment of view D of FIGURE 1.

Still another embodiment of the invention is shown at D in FIGURE 1 and in FIGURE 4. In this embodiment the link 63 again takes the form of a T shaped bar having a cross member 65 with its opposite ends loosely fitted in the facing openings 67 and 69 of adjacent thrust shoes. In this instance, however, the leg member 71 of the T shaped bar is secured to the upper face of a lower leveling block 23 as can be seen more clearly in FIGURE 4.

Clearly other alternative embodiments of the invention will become apparent to those skilled in the art. One of the primary features of the invention, however, is the deformable nature of the links connecting the thrust shoes with the remainder of the bearing assembly. Thus even if the bearing is positioned upside-down from that position shown in FIGURE 2, the individual links regardless of the particular embodiment employed will serve to restrain the thrust shoes from being accidentally dislodged from the assembly. On the other hand, once the bearing is positioned in its operational environment the shoe restraining links are insufficiently strong to restrain movement of the shoes under the normal operating pressure on the bearing.

As an additional factor to insure absence of restraint on the shoes by the shoe restraining links, the interconnection of the links with the shoes is such that the links do not even touch the shoe during a normal operation of the bearing.

I claim:

1. In a thrust bearing of the type including a retainer ring and a plurality of thrust shoes movably mounted about said retainer ring; means for retaining said thrust shoes in assembly with said retainer ring prior to installation of the bearing, said means comprising a deformable link connecting said thrust shoes to said retainer ring and solely preventing axial displacement of the thrust shoes, said means having a strength sufficient to withhold the weight of said thrust shoes but insufficient in all directions of contact with said thrust shoes, to restrain movement of said thrust shoes by the normal operating pressure on the bearing after installation.

2. In a thrust bearing as defined in claim 1 wherein said thrust shoes define an opening substantially perpendicular to the axis of the retainer ring and said link in cross section being substantially smaller than said opening, one end of said link being loosely fitted in said opening, the other end of said link being secured with respect to said retainer ring.

3. In a thrust bearing as defined in claim 1 wherein the difference in size of said opening and said link is at least as great as the amount of maximum possible movement of said thrust shoes at said openings during normal operation of the thrust bearing after installation.

4. A thrust bearing comprising a retainer ring and a plurality of thrust shoes disposed about said retainer ring in an annular array, said thrust shoes being movable with respect to said retainer ring, means for retaining said thrust shoes in assembly with said retainer ring prior to installation of the bearing, said means comprising a deformable link connecting said thrust shoes to said retainer ring, and solely preventing axial displacement of the thrust shoes, said means having a strength sufficient to withhold the weight of said thrust shoes but insufficient, in all directions of contact with said thrust shoes, to restrain movement of said thrust shoes by the normal operating pressure on the bearing after installation.

5. A thrust bearing as defined in claim 4 wherein said thrust shoes define an opening substantially perpendicular to the axis of the retainer ring and said link in cross section being substantially smaller than said opening, one end of said link being loosely fitted in said opening, the other end of said link being secured with respect to said retainer ring.

6. A thrust bearing as defined in claim 5 wherein the difference in size of said opening and said link is at least as great as the amount of maximum possible movement of said thrust shoes at said openings during normal operation of the thrust bearing after installation.

7. A thrust bearing comprising retainer ring means, a plurality of leveling block means disposed about said retainer ring means in an annular array, said leveling block means being restrained on said retaining ring means but being free for rocking movement thereon, a plurality of thrust shoes disposed about said retaining ring means for rocking movement on said leveling block means, and a plurality of deformable links connected between said plurality of thrust shoes and one of said means and solely preventing axial displacement of the thrust shoes, said links having a strength sufficient to withhold the weight of said thrust shoes but insufficient, in all directions of contact with said thrust shoes, to restrain movement of said thrust shoes by the normal operating pressure on the bearing.

8. A thrust bearing as defined in claim 7 wherein said plurality of links is connected between said plurality of thrust shoes and said retainer ring means.

9. A thrust bearing as defined in claim 7 wherein said plurality of links is connected between said plurality of shoes and said leveling block means.

10. A thrust bearing as defined in claim 7 wherein said thrust shoes define an opening therein substantially perpendicular to the axis of the retainer ring means, said link in cross section being substantially smaller than said opening, one end of said link being loosely fitted within said opening, the other end of said link being secured to one of said means.

11. A thrust bearing as defined in claim 10 wherein the difference in size of said opening and said link is at least as great as the amount of maximum possible movement of said thrust shoes at said openings during normal operation of the thrust bearing after installation.

12. A thrust bearing as defined in claim 7 wherein said thrust shoes include side edges substantially parallel to the axis of said retainer ring means, openings in said side edges, one end of one of said plurality of links being loosely fitted in each of said openings, said links in cross section being substantially smaller than said openings.

13. A thrust bearing as defined in claim 12 wherein the difference in size of said opening and said link is at least as great as the amount of maximum possible movement of said thrust shoes at said openings during normal operation of the thrust bearing.

14. A thrust bearing as defined in claim 13 wherein said openings are located in those side edges of each thrust shoe facing an adjacent thrust shoe.

15. A thrust bearing as defined in claim 14 wherein each of said plurality of links includes two ends, one end of each of said links being loosely fitted in one of said openings, the other end of each of said links being connected to one of said means.

16. A thrust bearing as defined in claim 14 wherein each of said links includes two ends and a central portion, the ends of each of said links being loosely fitted in the facing openings of adjacent thrust shoes, said central portion being connected to one of said means.

17. A thrust bearing as defined in claim 15 wherein each of said links comprises a T shaped bar, the opposite ends of the cross member of said T shaped bar being loosely fitted in the facing openings of adjacent thrust shoes, the leg member of said T shaped bar being connected to one of said means.

18. A thrust bearing comprising retainer ring means, a plurality of leveling block means disposed about said retainer ring means in an annular array, said leveling block means being restrained on said retaining ring means but being free for rocking movement thereon, a plurality of thrust shoes disposed about said retaining ring means for rocking movement on said leveling block means, and a plurality of links connected between said plurality of thrust shoes and one of said means and solely preventing axial displacement of the thrust shoes, said thrust shoes defining an opening therein substantially perpendicular to the axis of the retainer ring means, said link in cross section being substantially smaller than said opening, one end of said link being loosely fitted within said opening, the other end of said link being secured to one of said means, said link having a strength sufficient to withhold the weight of said thrust shoes but insufficient in all directions of contact with said thrust shoes to restrain movement of said thrust shoes by the normal operating pressure on the bearing after installation.

19. A thrust bearing as defined in claim 18 wherein the difference in size of said opening and said link is at least as great as the amount of maximum possible movement of said thrust shoes at said openings during normal operation of the thrust bearing after installation.

20. In a thrust bearing, a plurality of leveling blocks movably carried by a retainer ring, a plurality of thrust shoes assembled on the leveling blocks and spaced circumferentially as an annular array and deformable assembly retaining means disposed generally between adjacent blocks for retaining said blocks against disassembly during times when the bearing is not installed for use, said means comprising bendable elongated members, having points of attachment to the retainer ring, said members having portions extending in a general radial direction from said point of attachment and portions forming extremities extending generally circumferentially and connected to the first named portions, the opposed edges of the adjacent blocks having openings in which said last named portions are loosely retained, and said portions solely preventing axial displacement of the thrust shoes.

References Cited by the Examiner

UNITED STATES PATENTS

| 2,744,799 | 5/1956 | Howarth | 308—160 |
| 3,011,839 | 12/1961 | Gruber | 308—160 |
| 3,061,384 | 10/1962 | Schaefer | 308—160 |
| 3,142,519 | 7/1964 | Abrahamovitz | 308—160 |
| 3,160,450 | 12/1964 | Gentiluomo | 308—160 |

FRANK SUSKO, *Primary Examiner.*

ROBERT C. RIORDON, DON A. WAITE, *Examiners.*